United States Patent [19]

Christensen

[11] Patent Number: 4,759,059
[45] Date of Patent: Jul. 19, 1988

[54] ANALOG TELEPHONE CIRCUIT FOR DIGITAL TELEPHONE SYSTEM

[76] Inventor: Larry B. Christensen, 1633 Merrimac Trail, Garland, Tex. 75043

[21] Appl. No.: 616,118

[22] Filed: Jun. 1, 1984

[51] Int. Cl.$^4$ ............................................. H04Q 5/00
[52] U.S. Cl. ................................... 379/161; 379/166; 379/394; 379/399
[58] Field of Search ............. 179/99 R, 99 M, 99 LC, 179/81 R, 16 AA, 16 A, 16 F, 170 NC, 18 FA, 2 OP; 370/58; 379/161, 166, 394, 399, 156, 157, 387, 400, 419, 162, 167, 159, 49, 94, 405, 58, 245

[56] References Cited

U.S. PATENT DOCUMENTS

| | | | |
|---|---|---|---|
| 3,914,559 | 10/1975 | Knollman | 379/156 |
| 4,085,449 | 4/1978 | Walsh et al. | 364/900 |
| 4,088,844 | 5/1978 | Kinnaird, Jr. | 379/162 |
| 4,142,075 | 2/1979 | Olschewski | 379/405 |
| 4,238,644 | 12/1980 | Dijkmans et al. | 379/413 |
| 4,322,581 | 3/1982 | Christain et al. | 379/245 |
| 4,456,991 | 6/1985 | Chea, Jr. et al. | 370/58 |
| 4,514,597 | 4/1985 | Kikuchi et al. | 379/167 |
| 4,521,643 | 6/1985 | Dupuis et al. | 379/49 |
| 4,535,199 | 8/1985 | Zink | 379/94 |
| 4,572,928 | 2/1986 | Nishimura et al. | 379/159 |

OTHER PUBLICATIONS

"The Switched Network Transaction Telephone System", Froehlich et al., The Bell System Technical Journal, vol. 57, No. 10, Dec. 1978, pp. 3475–86.
"Skinny-Wire Key Telephones and the Rolm CBX", J. Kasson, Conference: 1976 National Telecommunications Conference, Dallas, Tex, U.S.A. (29 Nov.–1 Dec. 1976), pp. 11.4-1–11.4-4.

Primary Examiner—Thomas W. Brown
Assistant Examiner—R. Vaas
Attorney, Agent, or Firm—Larry B. Christensen

[57] ABSTRACT

An interface circuit for interconnecting an analog telephone device with a digital telephone system includes an independent power supply (58) for driving the loop termination on an analog telephone device (22). An impedance matching circuit (54) and a summing network (42) are utilized to both couple the signal from the analog telephone device (22) to the analog input of a key service unit (10) and match the impedance therebetween. A switch, (46) is provided to disconnect the analog port of a digital telephone device (12) that is compatible with the key service unit (10). When the analog telephone device (22) is in the off-hook mode, a switch control (52) opens the switches (48) and (50) of switch (46). The digital telephone device (12) is under the control of a digital transmission line (20) to maintain an analog interconnection in the key service unit (10). The analog telephone device (22) operates on an independent loop termination with an independent loop current. The signal generated in the loop is summed with the analog port (18) of the key service unit (10) through the summing network (42). In this manner, an inexpensive analog telephone device (22) with a non-compatible termination requirement can be utilized on a digital telephone system such as a key service unit (10) or a PBX.

8 Claims, 1 Drawing Sheet

ANALOG TELEPHONE CIRCUIT FOR DIGITAL TELEPHONE SYSTEM

TECHNICAL FIELD OF THE INVENTION

The present invention pertains in particular to digital telephone systems and, more particularly, to an interface circuit for allowing connection of a conventional analog telephone device operating at a different DC voltage to a presently existing digital telephone device connected to a digital telephone system through a digital connector of the digital telephone system.

BACKGROUND OF THE INVENTION

Digital telephone systems have been developed to increase the versatility of a centralized system in an office or building while providing the proper interface to the central telephone office network. These digital telephone systems utilize an analog transmission line and a digital transmission line for connection to a digital telephone set or other digital telephone device. Since the digital telephone system provides a separate interface to the central office telephone network, the termination to the digital telephone set on the digital port thereof does not have to be the conventional −48 volts. In so doing, a particular manufacturer can customize his terminations and voltage levels to suit his manufacturing purposes.

To control processing of telephone signals in the digital telephone system, the digital transmission paths are utilized between the digital telephone system and the digital peripheral devices connected thereto. The digital transmission path can be either a four wire path for simplex transmission or a two wire path for a multiplex transmission. The simplex system provides two wires for receiving digital data and two wires for transmitting digital data from the digital peripheral device back to the digital telephone system.

One disadvantage to digital telephone systems is that they do not provide for the connection of conventional analog telephone devices on the digital port. The voltage levels required for a conventional analog telephone device and the impedance thereof does not facilitate direct connection to the digital port of a digital telephone system. In addition, an analog communication path must also be present in order for analog transmission to be placed on the digital port of the digital telephone system. Therefore, there exists a need for an interface circuit that allows the interface of a conventional analog telephone device with a digital telephone system in conjunction with one of the digital peripheral devices connected to the digital telephone system.

SUMMARY OF THE INVENTION

The present invention disclosed and claimed herein comprises an interface circuit for interfacing between the digital port of a digital telephone system that services digital telephone devices and an analog peripheral telephone device. The interface circuit includes an independent power supply for supplying power to the analog telephone device and a loop circuit for interconnection between the power supply and the analog telephone device for generating a loop current in the analog telephone device. A summing circuit is connected between the analog telephone device and the digital port of the digital telephone system and the digital telephone device, the summing circuit AC coupled therebetween. An impedance matching circuit matches the internal impedance of the analog telephone device to the impedance of the digital telephone system when the analog telephone device is in the off-hook mode. The digital telephone device maintains a digital interface with the digital telephone system during the off-hook mode of the analog telephone device to provide system control of the digital port to which the analog telephone device is interfaced.

In another embodiment of the present invention, a switch is provided between the digital port of the digital telephone device and the digital port of the digital telephone system to allow control thereof. The switch is operated in response to the now interfaced analog telephone device going to the off-hook mode. In this manner, audio feedback between the digital telephone device and the analog telephone device eliminated. The impedance matching circuit accounts for the impedance difference in the closed and open switch condition of the switch.

BRIEF DESCRIPTION OF THE DRAWINGS

For a more complete understanding of the present invention and the advantages thereof, reference is now made to the following description taken in conjunction with the accompanying Drawings in which.

DETAILED DESCRIPTION OF THE INVENTION

Figure 1:
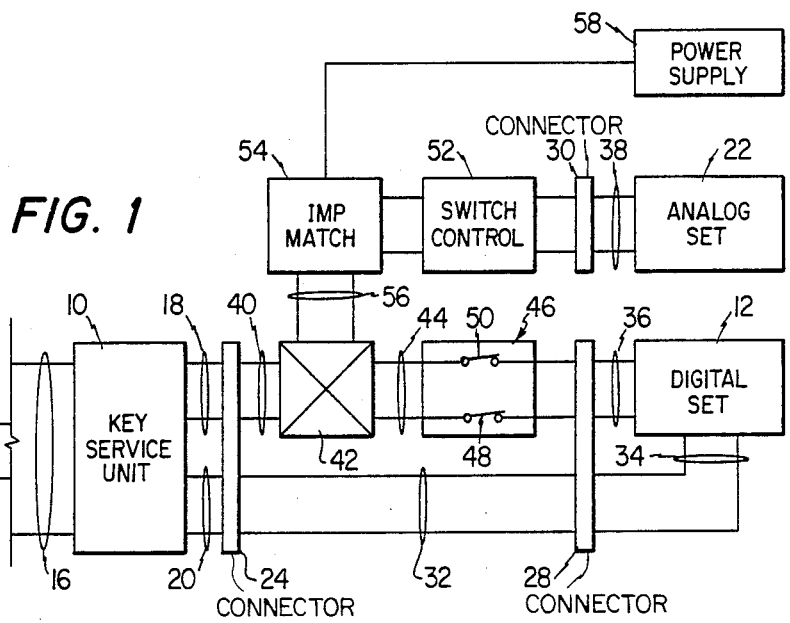
FIG. 1 illustrates a block diagram of a digital telephone system with the interface circuit of the present invention incorporated therein.

Referring now to FIG. 1, there is illustrated a block diagram view of the interface circuit connected to a digital control system in accordance with the present invention. A key service unit 10 is provided to interface a digital telephone set 12 with a central office (CO) 14. The CO 14 is interconnected with the key service unit 10 through a wire line transmission system 16. The digital telephone set 12 is interfaced with the KSU 10 through an analog wire line transmission path 18 and through a digital transmission path 20. The KSU 10 is any system that services digital peripheral telephone devices and can either be a key service unit, a PBX or a similar telephone system. One type of telephone system that can be utilized is a Nippon Electric Corporation (NEC) type 616 telephone system which is compatable with an NEC type ET-6-1 digital telephone, PN 53101.

The KSU 10 is operable to interface customized digital telephone sets 12 with incoming lines from the CO 14. Depending upon the application, there can be a number of incoming lines that are assigned to a given KSU 10. The KSU 10 is operable to interconnect any one of the attached digital peripheral devices to any one of the incoming CO telephone lines. In the example illustrated in FIG. 1, only one digital telephone set 12 is illustrated and only one telephone line 16 is illustrated between the CO 14 and the KSU 10. However, it should be understood that numerous telephone lines from the CO 14 can be accommodated and a plurality of digital telephone sets 12 can be interconnected through the KSU 10.

The digital transmission path 20 is illustrated as a two wire digital path. This is a multiplexed digital transmission path; that is, digital control data output by the KSU 10 travels along the digital path 20 to the digital telephone set 12 and digital data output by the digital telephone set 12 also travels along the digital transmission path 20 in a multiplexed format. In another digital transmission scheme, four digital transmission lines are provided with two carrying digital information from the KSU 10 to the digital telephone set 12 and two carrying information from the digital telephone set 12 to the KSU 10. This is known as a "simplex" system. With either the multiplexed or the simplex system, the transmission of information along the wire line transmission path 18 is controlled by the digital interface between the KSU 10 and the digital telephone set 12.

The KSU 10 serves to provide the correct termination to the incoming telephone line 16 in compliance with FCC standards. The KSU 10 provides this termination independent of the output impedance of the digital sets 12. Therefore, the analog impedance between the input analog port of the KSU 10 and the input analog port of the digital telephone set 12 does not have to equal the line impedance of the telephone lines 16. It is only necessary to convert the impedance of the analog transmission at the analog input of the KSU 10 to the proper impedance level for transmission over the telephone line 16.

As a result of the differing impedances between the analog transmission lines 18 and the telephone line 16, a conventional analog telephone set is not compatible with the analog transmission lines 18. To interface an analog set 22 with the analog data lines 18, an interface circuit in accordance with the present invention is utilized. The interface circuit is enclosed in a housing (not shown) which is accessed by a KSU connector 24, a digital set connector 28 and an analog set connector 30. The KSU connector 24 is operable to receive the analog transmission lines 18 from the input of the KSU 10 and also the digital transmission lines 20. An interconnecting set of digital transmission lines 32 is connected between the KSU connector 24 and the digital telephone set connector 28. The digital telephone set 12 is connected to the connector 28 through digital lines 34 for interface with the connecting digital lines 32. A pair of analog transmission lines 36 are connected from the digital telephone set 12 to the connector 28 for interface with the analog portion of the interface circuit in accordance with the present invention. The analog telephone set 22 is connected to the analog set connector 30 through a pair of analog transmission lines 38 for interface therewith.

A pair of analog transmission lines 40 is connected between the analog portion of the connector 24 and a summing network 42. A pair of analog transmission lines 44 is connected between the summing network 42 and a double-pole single-throw switch 46. The switch 46 has an internal switch 48 and an internal switch 50 that are each individually connected to the analog portion of the connector 28 for interface with the analog transmission lines 36 that are connected to the digital telephone sets 12. Although two contacts are illustrated, one contact is sufficient to prevent analog transmission to and from the digital telephone set 12.

The connector 30 interfaces the analog telephone set to a switch control 52 which controls the switch 46, as will be described hereinbelow. The switch control 52 is connected to an impedance matching circuit 54, the output of which is interfaced with the summing network 42 through a pair of analog transmission lines 56. A power supply 58 is connected to the impedance matching circuit 54 and supplies power through the impedance matching circuit 54 and switch control 52 for the analog set 22. The power supply 58 is isolated from the key service unit 10 at the analog transmission lines 18 by the summing network 42. In this manner, differing voltages used to supply power to the analog telephone set 22 can be facilitated.

The impedance matching circuit 54, switch control 52 and power supply 58 are utilized in conjunction with the analog telephone set 22 to provide a telephone loop that is independent with regard to loop currents for the analog telephone set 22. When the analog telephone set 22 is in the off-hook mode, a loop is formed with a loop current generated therein. Modulation is developed in this loop which is then coupled to the analog telephone lines 18 on the input of the KSU 10 through the summing network 42. When the analog telephone set 22 is in the off-hook mode, the switches 48 and 50 of the switch 46 are opened up to remove the analog transmission path between the KSU 10 and the digital telephone set 12. This will be described in more detail hereinbelow.

Figure 2:
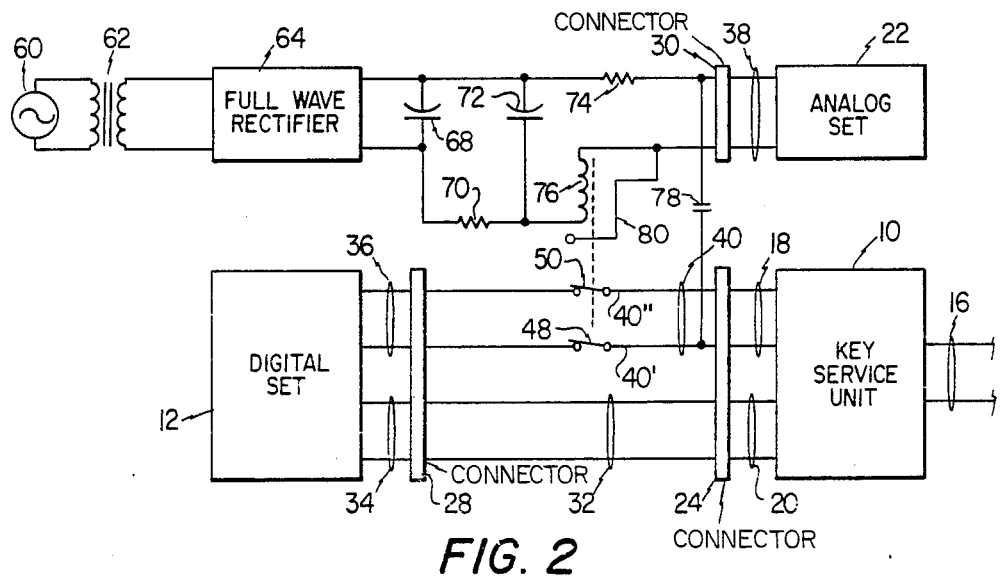
FIG. 2 illustrates a schematic diagram of the interface circuit connected to the digital telephone system in accordance with the present invention.

Referring now to FIG. 2, there is illustrated a schematic diagram of the interface circuit connected between an analog telephone device and the digital telephone system, wherein like numerals refer to like parts in the two figures. The power supply 58 of FIG. 1 consists of an ac signal source 60 connected to the primary of a power transformer 62. The secondary of the power transformer 62 is connected to two terminals of a full-wave rectifier 64. The output terminals of the full-wave rectifier 64 are connected to a shunt filter capacitor 68. The ac source 60, transformer 62, rectifier 64 and capacitor 68 are functional to provide a regulated dc voltage from the output thereof. In the preferred embodiment, this voltage is approximately 36 to 42 volts dc.

A resistor 70 has one end thereof connected to the positive side of the full-wave rectifier 64 and the other end thereof connected to one end of a shunt capacitor 72. The other end of the shunt capacitor is connected to the negative side of the full-wave rectifier 64. A series resistor 74 has one end thereof connected to the negative side of the full-wave rectifier 64 and the other end thereof connected to one terminal of the connector 30. A relay 76 has one end thereof connected to the junction of the resistor 70 and capacitor 72 and the other end thereof connected to the remaining terminal of the connector 30. The relay 76 is operable to open the switches 48 and 50 that are in series with the analog transmission lines 40 when current is drawn therethrough.

When the analog telephone set 22 is connected to the connector 30 through the transmission lines 38, the resistor 70, the resistor 74 and the relay 76, in conjunction with the power supply 58, form a current loop with the analog telephone set 22. Conventional telephone sets have an impedance of approximately 600 ohms when they are in an off-hook condition. When this off-hook condition occurs, current is drawn through the loop and this current is modulated by the analog set 22 through, for example, voice. Since the power supply 58 is an independent supply, the modulation of the current in this loop is independent of dc current paths in the KSU 10 and the associated one of the digital telephone sets 12.

The KSU 10 provides a dc polarity on the transmission lines 18. This transmission line 18 is a two wire telephone line and the dc polarity is determined by the particular applications of the KSU 10 and the specifications thereof. The only requirement for the KSU 10 is that it provides a proper termination for the telephone line 16 that is connected with the CO 14. The telephone lines 18 interfacing with the digital set 12 on the other side of the KSU 10 have a dc polarity and impedance determined by the specific type of digital telephone set 12 utilized and the standarization thereof. However, this is not regulated by the FCC, as is the terminations required by the CO 14.

In the preferred embodiment, the KSU 10 has a dc polarity of 24 volts impressed across the telephone lines 18. The telephone lines 40 have a voltage impressed thereacross as a result of being interconnected with the telephone lines 18. For illustrated purposes, the negative polarity of the lines 40 is designated 40' and the positive polarity of the telephone lines 40 is designated 40". The summing network 42 is comprised of a series capacitor 78 which is connected between the side of the relay 76 interfaced with the connector 30 and the line 40". The other terminal of the connector 30 is directly connected to the negatively biased line 40' through a connecting line 80.

The operation of the system will now be described in more detail. In normal operation, the analog telephone set 22 can consist of a conventional analog telephone handset and the digital telephone set 12 can consist of a digital telephone handset. In normal operation, the KSU 10 effects a telephone connection between the digital telephone set 12 and the telephone line 16. As described above, there may be a number of digital telephone lines 16 between the KSU 10 and the CO 14, and the KSU 10 is operable to connect the digital telephone set 12 to one of these lines. This connection is effected through digital signals transmitted through the digital telephone transmission path 20, the connector 24, the interconnecting digital lines 32 and the connector 28. This connection can be of either an incoming call or an outgoing call. For an incoming call, the KSU 10 addresses the digital telephone set 12 through the digital transmission path and, upon recognizing this address, an analog path is effected through the analog transmission path 18. For the normal mode, the switches 48 and 50 of the switch 46 are closed.

When it is desired to connect an analog telephone device 22 to the analog input port of the KSU 10, it is only necessary to put the analog telephone set 22 in an off-hook mode. Once the analog telephone set is placed in the off-hook mode, a loop current is generated through the internal coil of the relay coil 76, thus opening the switches 48 and 50, as described above. This removes an analog transmission path between the digital telephone set 12 and the KSU 10. However, the digital transmission path 20 is still present, thus maintaining a connection therebetween. Since the analog set 22 is ac coupled to the transmission lines 40 through the series capacitor 78, any modulation that is impressed thereacross will appear on the transmission lines 40 and be transferred through the connector 24 to the analog transmission path 18 to the KSU 10. In this manner, an analog telephone set 22 having a different operating impedance and current than the digital telephone set 12 can be interfaced with the analog port of the KSU 10.

To maintain a proper impedance match between the loop operating the analog telephone set 22 and the input impedance of the analog port of the KSU 10, the values of the resistors 70 and 74, the capacitor 72 and the inductance of the relay 76 provide this impedance match. In the preferred embodiment, the resistor 70 has a value of 22 ohms, the resistor 74 has a value of 150 ohms and the relay 76 has a resistance of 2400 ohms. The resistor 70 and 74 and the resistance of the relay 76 provide the dc path resistance to the loop for the analog telephone set 22. The capacitor 72 has a value of 100 microfarads and the capacitor 78 has a value of 1.0 microfarads. The capacitor 68 is a very large value capacitor to provide the very low impedance for ac signals. This matching impedance matches a 600 ohm analog telephone set to the input impedance of the KSU 10. These values can be altered and other matching networks can be utilized to match the impedance to a given KSU 10 or other digital telephone systems such as PBX's. When the analog telephone set 22 is not off-hook, the matching network comprised of the resistors 70 and 74, the relay 76 and the capacitor 72 and 78 is connected in parallel across the telephone lines 40 with the 600 ohm internal impedance of the analog telephone set 22 disconnected from the loop.

In an alternate embodiment of the present invention, the switches 48 and 50 of the switch 46 are maintained in a closed position when the analog set 22 is off-hook. With the switch 46 so connected, the analog telephone set 22 and the digital telephone set 12 can utilize the digital transmission path 18 of the KSU 10 simultaneously. This interconnection method would be utilized when, for example, an extension telephone is desired which is not compatible with the KSU 10. By utilizing the interface circuit of the present invention, it is not necessary to purchase a digital telephone handset that is compatible with the KSU 10, thus resulting in a lower expense incurred for expanding a given system. When the digital telephone set 12 is maintained in communication with the analog transmission line 18, the impedance matching network on the loop of the interface circuit must be altered in value to accommodate the connection of the internal 600 ohm impedance of the analog telephone set 22 and the internal analog impedance of the digital telephone set 12.

In summary, there has been provided an interface circuit which allows the interconnection of an analog telephone set with a digital telephone system where the impedance of the analog telephone set is not compatible with the digital telephone system. The interconnection is effected by interfacing the digital telephone system with a peripheral digital telephone device that is compatible with the system. The analog path between the analog input of the digital telephone system and the analog input of the digital telephone device is disconnected and the analog telephone device coupled to the analog input of the digital telephone system through the interface circuit of the present invention. The interface circuit is comprised of an independent power supply and a matching circuit which both provide a loop termination for the analog telephone set and an impedance match for ac coupling the signal generated in the loop termination to the analog input of the digital telephone system.

Although the preferred embodiment has been described in detail, it should be understood that various changes, substitutions and alterations can be made therein without departing from the spirit and scope of the invention as defined by the apended claims.

What is claimed is:

1. An interface circuit for interfacing between a digital connector of a digital telephone system for servicing a digital telephone device, and an analog peripheral telephone device, the digital connector interconnected to the digital telephone system through a digital communication path for transmitting/receiving control information, and an analog communication path, the analog communication path having an associated internal impedance matching that of the digital telephone device, and the analog peripheral telephone device having a different associated internal impedance, than the digital telephone device, comprising:

power supply means for supplying power to the analog telephone device, independent of the digital telephone system and the digital telephone device and supplying power for forming a loop termination therefor;

summing means for adding the analog output of the analog telephone device with said interconnected analog communication path through said digital connector, to provide a full duplex audio path between the analog output of the analog telephone device and the digital telephone system, and the digital telephone device;

impedance matching means for providing a sound-transmitting match between the associated internal impedance of the analog output of the analog telephone device, and the associated internal impedance of the analog communication path of the digital telephone system and the digital telephone device, the analog telephone device having an off-hook mode to allow analog communications between the analog output of the analog telephone device and said summing means, and an on-hook mode to prohibit analog communications between the analog output of the analog telephone device and said summing means; and the digital telephone device providing a digital interface between the digital communication path interconnected with said digital connector of the digital telephone system during the off-hook mode of the analog telephone device, such that control information can be passed between the digital telephone device and the digital telephone system through said digital connector and said interconnecting digital communication path.

2. The interface circuit of claim 1 and further comprising means responsive to the analog device for inhibiting the connection of the interconnected analog communication path through said digital connector to the digital telephone device when the analog telephone device is in the off-hook mode.

3. An interface circuit for interfacing between a digital connector of a digital telephone system that services digital telephone devices, and an analog telephone device having a two wire analog output, the digital connector interfaced through a two wire analog communication path and a two wire digital communication path to the digital telephone system, the digital communication path for transmitting and receiving control information to and from the digital telephone system and a digital telephone device, the analog communication path for transmitting and receiving analog information to and from the digital telephone system and the digital telephone device and having an associated internal impedance, and the analog telephone device having a different associated internal impedance for the analog output thereof, comprising:

power supply means for supplying power to the analog device through the analog output thereof independent of the digital telephone system and the digital telephone device, said power supply means for forming a loop termination for the analog telephone device;

a two wire connecting path connected between the two wire analog output of the analog telephone device and the two wire analog communication path interfaced with the digital connector, one wire of said connecting path connected through said digital connector to one of the wires of the two wire analog communication path interfaced with the digital connector and the remaining wire of said connecting path ac coupled through said digital connector to the remaining one of the wires of the analog communication path interfaced with the digital connector such that said power supply means of the interface circuit is isolated from the analog communication path interfaced with the digital connector and the digital telephone device;

impedance matching means for providing a sound-transmitting match between the associated internal impedance of the analog output of the analog telephone device, and the associated internal impedance of the analog communication path interfaced with the digital connector of the digital telephone system and the digital telephone device, the analog telephone device having an off-hook mode providing for analog communication between the analog telephone device and the analog communication path through the digital connector interfaced with the digital telephone system, and an on-hook mode to prohibit analog communication with the analog telephone device;

means for providing a digital interface between a digital telephone device and the digital connector to allow the digital telephone device to maintain digital communication with the digital telephone system;

switch means operating in a first mode for allowing the analog telephone device to be interfaced with the analog communication path through the digital connector and in a second mode for selectively prohibiting the analog telephone device from being interfaced with the analog communication path through the digital connector of the digital telephone system; and means for activating said switch means to operate in said first mode when the analog telephone device is in the off-hook mode and to operate in said second mode when the analog telephone device is in the on-hook mode, the digital telephone device when interfaced with the digital communication path interfaced with the digital connector maintaining digital communication with the digital telephone system through the digital communication path interfaced with the digital connector at all times.

4. The interface circuit of claim 3 wherein said power supply means comprises an A-C power source for converting A-C line current to D-C power to supply the analog telephone device.

5. The interface circuit of claim 3 wherein said power supply means comprises a battery.

6. The interface circuit of claim 3 wherein the ac coupled wire of said two wire connecting path is ac coupled through the digital connector with a series capacitor connected between said remaining one of the wires interfaced with the two wire analog communication path of the digital connector and said remaining wire of said connecting path.

7. The interface circuit of claim 3 wherein said switch means comprises a double-pole switch that inhibits both wires of the two wire analog communication path interfaced with the digital connector interfaced with the digital telephone system from being interfaced with the digital telephone device.

8. The interface circuit of claim 7 wherein said activating means comprises a relay coil connected to a dc power source for activating said switch, said coil activated in response to the analog telephone device being in the off-hook mode such that the digital telephone device is inhibited from being interfaced with the analog communication path of the digital connector interfaced with the digital telephone system when the analog telephone device is in the off-hook mode.

* * * * *